United States Patent [19]

Iwagaya

[11] Patent Number: 5,027,045
[45] Date of Patent: Jun. 25, 1991

[54] HIGH-PRECISION PULSE INTERPOLATION METHOD

[75] Inventor: Takashi Iwagaya, Shizuoka, Japan

[73] Assignee: Fanuc Ltd., Minamitsuru, Japan

[21] Appl. No.: 415,349

[22] PCT Filed: Jan. 12, 1989

[86] PCT No.: PCT/JP89/00028
§ 371 Date: Sep. 7, 1989
§ 102(e) Date: Sep. 7, 1989

[87] PCT Pub. No.: WO89/06836
PCT Pub. Date: Jul. 27, 1989

[30] Foreign Application Priority Data
Jan. 19, 1988 [JP] Japan ................................ 63-8791

[51] Int. Cl.$^5$ .............................................. G05B 19/29
[52] U.S. Cl. .................................. 318/571; 318/567; 318/568.1; 318/603; 364/474.28
[58] Field of Search ........................ 318/560-640; 364/180-184, 474.11, 474.29, 474.28, 474.30, 474.31, 474.32

[56] References Cited

U.S. PATENT DOCUMENTS

| | | | |
|---|---|---|---|
| 4,125,897 | 11/1978 | Murata et al. | 318/603 X |
| 4,400,781 | 8/1983 | Hotta et al. | 318/571 X |
| 4,502,108 | 2/1985 | Nozawa et al. | 318/632 X |
| 4,528,491 | 7/1985 | Takeuchi et al. | 318/567 X |
| 4,543,625 | 9/1985 | Nozawa et al. | 318/571 X |
| 4,549,271 | 10/1985 | Nozawa et al. | 318/603 X |
| 4,675,490 | 6/1987 | Matsui et al. | 318/569 X |
| 4,683,543 | 7/1987 | Hirasawa et al. | 318/573 X |
| 4,694,233 | 9/1987 | Yoneda et al. | 318/569 |
| 4,728,872 | 3/1988 | Kishi et al. | 318/567 X |
| 4,855,657 | 8/1989 | Isobe et al. | 318/602 |
| 4,858,103 | 8/1989 | Takeuchi et al. | 318/568.1 X |
| 4,873,476 | 10/1989 | Kurakake et al. | 901/9 X |
| 4,908,555 | 3/1990 | Ikeda et al. | 318/567 |

Primary Examiner—Paul Ip
Attorney, Agent, or Firm—Staas & Halsey

[57] ABSTRACT

A high-precision pulse interpolation method for interpolating the amount of movement of individual axes of a numerical control apparatus (1) with high precision. An interpolation pulse is output twice or more in one task and is written into a shared RAM (2). A servo control circuit (3) outputs the interpolation pulses in the shared RAM at regular intervals, to control a servometer (5) with a high-precision pulse interpolation.

4 Claims, 4 Drawing Sheets

HIGH-PRECISION PULSE INTERPOLATION METHOD

CROSS REFERENCE TO RELATED APPLICATIONS

This application is cross-referenced to U.S. application Ser. No. 07/342,533 and U.S. application Ser. No. 07/342,534.

BACKGROUND OF THE INVENTION

The present invention relates to a high-precision pulse interpolation method, and more particularly, to a high-precision pulse interpolation method for controlling a piston lathe and the like.

Due to the increasing speed of microprocessors and increased integration of memory circuits, etc., numerical control apparatuses must carry out more complex controls and process greater quantities of data. Accordingly, a time allowed for carrying out pulse interpolation is very limited. Particularly, when using an increased number of axes, it is difficult to shorten the task period for a pulse interpolation, which is about 5 to 10 ms.

Nevertheless, to carry out machining by using a piston lathe, a cam grinder or the like, or the equivalent to a conventional machining using a cam, a task period of about 1 ms is required.

Such a task period can be achieved if a faster microprocessor or more microprocessors are used. This, however, greatly increases costs and thus is not practical.

SUMMARY OF THE INVENTION

In view of the foregoing, the object of the present invention is to provide a high-precision pulse interpolation method of controlling a piston lathe and the like.

To achieve the above object, the present invention provides a high-precision pulse interpolation method wherein an amount of movement of individual axes of a numerical control apparatus is interpolated with a high precision. The ; and method comprises outputting an interpolation pulse twice or more during one task, the interpolation pulse being output at regular intervals by a servo control circuit to thereby carry out a pulse interpolation with a high precision.

That is, a plurality of interpolations are carried out during one task. Each interpolation pulse is delivered to the servo control circuit, which then outputs the interpolation pulse at regular intervals for processing, whereby a result equivalent to a pulse interpolation in a shorter task period can be obtained.

DESCRIPTION OF THE PREFERRED EMBODIMENT

An embodiment of the present invention will now be described with reference to the drawings.

Figure 3:
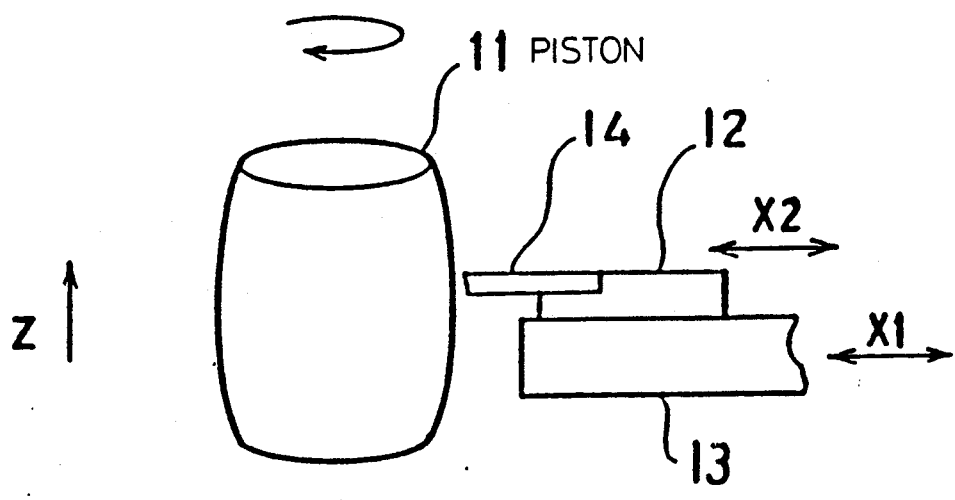
FIG. 3 is a schematic diagram of a piston lathe to which the present invention is applied.

FIG. 3 is an example of a piston lathe to which the present invention is applied. In FIG. 3, a piston 11 is fixed to and rotated by a chuck, not shown, and a tool 14 for turning is moved in the X-axis and Z-axis directions. The X axis comprises an X1 axis 13 and an X2 axis 12. The X2 axis 12 is designed to move at a high speed. The movement of the X axis is normally controlled by the X1 axis 13.

To machine the piston 11 at a high speed with the arrangement of FIG. 3, the X2 axis 12 must quickly respond in synchronism with the rotation of the piston 11, and therefore, a task time for the necessary interpolation should be approximately 1 ms.

Figure 4:
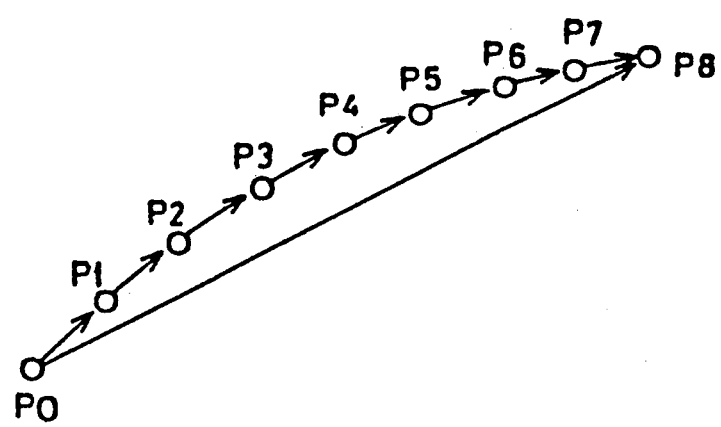
FIG. 4 is a diagram illustrating the relationship between an interpolation and a task time.

FIG. 4 is a diagram illustrating the relationship between the interpolation and the task time. Assuming that an interpolation is carried out between points P0 and P8, if the task period is 8 ms, then the interpolation is carried out linearly from point P0 to point P8, and accordingly, a deviation from the intended curve occurs. In contrast, if the task period is 1 ms, an interpolation is carried out for points P1, P2, P3, . . . and P8, whereby a curve closer to the intended curve is obtained. The present invention is capable of carrying out such an interpolation regardless of the performance of the microprocessor and without increasing the number of microprocessors used.

Figure 1:
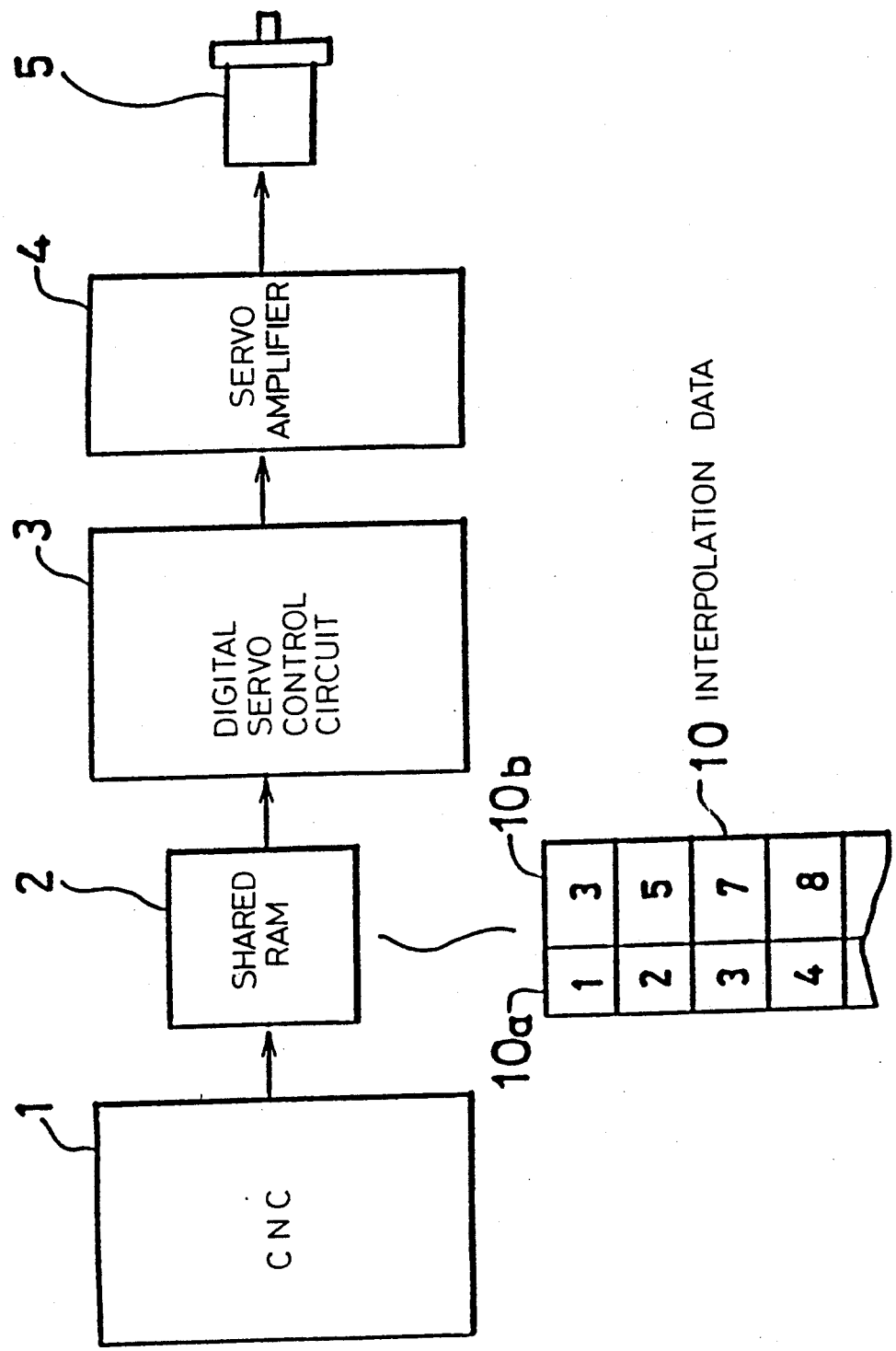
FIG. 1 is a block diagram illustrating a numerical control apparatus according to one embodiment of the present invention.

FIG. 1 is a block diagram of a numerical control apparatus according to one embodiment of the invention. As shown in FIG. 1 a numerical control apparatus (CNC) 1, a shared RAM 2, a digital servo control circuit 3, a servo amplifier 4, and a servomotor 5 are connected in series. The numerical control apparatus (CNC) 1 carries out a pulse interpolation eight times during a one eighth period of every task, and writes data 10 of the eight interpolations into the shared RAM 2. 10a denotes the data number and 10b denotes the number of pulses for one interpolation.

The digital servo control circuit 3 reads this data, and delivers it separately according to the eight interpolations, and therefore, the numerical control apparatus (CNC) 1 can control the servomotor 5 in the same way as when the interpolation is carried out in a ⅛ period of a task.

Of course, the number of times the interpolation is carried out during one task is determined by the required interpolation period, the processing speed of the microprocessor, and tasks to be processed other than the pulse interpolation, etc.

Instead of performing a plurality of interpolations during each task, a large number of interpolations may be previously carried out. The interpolation data may be sent collectively in units of eight interpolations to the digital servo control circuit 3 through the shared RAM 2.

Figure 2:
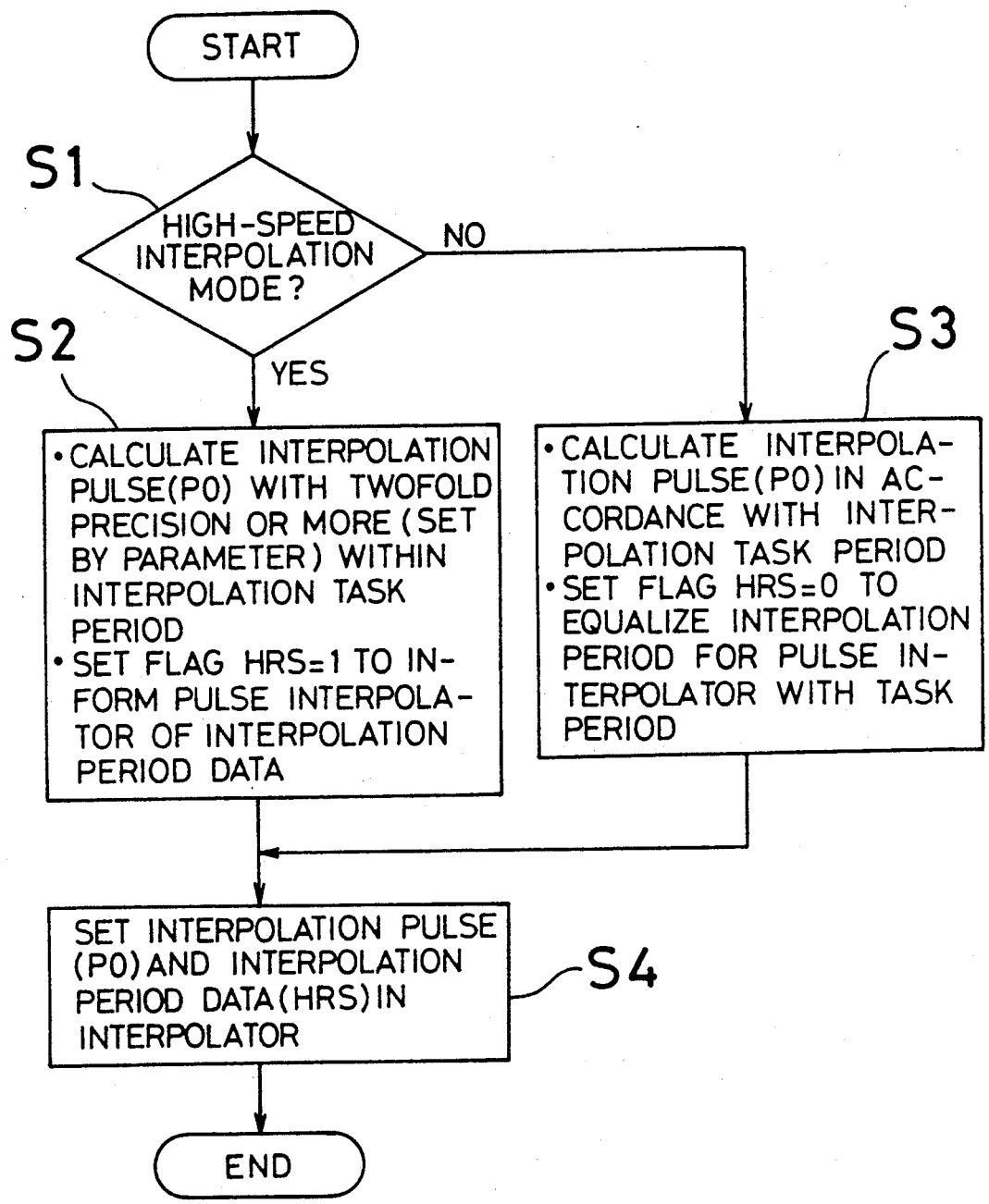
FIG. 2 is a flowchart of a process executed in the numerical control apparatus (CNC)

FIG. 2 is a flowchart of a process executed in the numerical control apparatus (CNC) 1, wherein the number prefixed by "S" represents the step number.

[S1] It is determined whether the mode is a high-speed interpolation mode. If the mode is a high-speed interpolation mode, S2 is executed, and if not, S3 is executed.

[S2] An interpolation is carried out eight times during an interpolation task period, an interpolation pulse P0 is output, and a flag HRS=1 is set to inform a pulse interpolator of the interpolation period.

[S3] An interpolation is carried out in accordance with the interpolation task period, and an interpolation pulse P0 corresponding to one interpolation is output for one task. The interpolation period for the pulse interpolator is equal to the task period, and HRS=0 is set.

[S4] P0 and HRS are set in the interpolator.

A high-precision pulse interpolation is carried out as shown above, but of course, the number of times the interpolation is carried out during one task is determined by the required interpolation period, the processing speed of the microprocessor, and tasks to be processed other than the pulse interpolation, etc.

In the above description, the piston lathe is referred to as a controlled system. The invention also can be used, for example, for a prior art grinder using a cam, etc. The use of the present invention eliminates the need to fabricate a cam and thus shortens the process.

As described above, according to the present invention, an interpolation is carried out twice or more during one task period, and the interpolation data is divided and output by the servo control circuit. Accordingly, it is unnecessary to use a microprocessor having a different performance, or to increase the number of microprocessors, to carry out a high-precision pulse interpolation. Therefore, a high-precision pulse interpolation can be carried out for a prior art machine tool which performs machining by using a cam, by eliminating the need to use a cam.

I claim:

1. A high-precision pulse interpolation method in which an amount of movement of individual axes of a numerical control apparatus is interpolated with high precision, said method comprising the steps of:
    (a) determining whether the mode is a high speed interpolation mode;
    (b) interpolating during an interpolation task period when a high speed interpolation mode is determined and setting an interpolation period;
    (c) interpolating in accordance with the interpolation task period when a high speed interpolation mode is not determined, the interpolation period being equal to the interpolation task period; and
    (d) carrying out the high speed interpolation.

2. A high-precision pulse interpolation method according to claim 1, wherein said numerical control apparatus controls a piston lathe.

3. A high-precision pulse interpolation method according to claim 1, wherein said numerical control apparatus controls a cam grinder.

4. A high-precision pulse interpolation method according to claim 1, wherein said servo control circuit comprises a digital servo control circuit.

* * * * *